US012786170B2

(12) United States Patent
Popkave et al.

(10) Patent No.: US 12,786,170 B2
(45) Date of Patent: Nov. 3, 2026

(54) INTERIM CONNECTIONS FOR PROVIDING SECURE COMMUNICATION OF CONTENT BETWEEN DEVICES

(71) Applicant: MICROSOFT TECHNOLOGY LICENSING, LLC, Redmond, WA (US)

(72) Inventors: Travis Jay Popkave, Seattle, WA (US); Jessica Bourgade, Seattle, WA (US); Mark Derek Raymond, Jr., Redmond, WA (US); Bryan Kim Mamaril, Seattle, WA (US); Regina Hajin Son, Seattle, WA (US); Corey Joseph Loman, Seattle, WA (US); Cassandra Lynn Hoef, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/137,171

(22) Filed: Dec. 29, 2020

(65) Prior Publication Data

US 2022/0210133 A1 Jun. 30, 2022

(51) Int. Cl.
*H04L 9/40* (2022.01)
*G06F 3/0484* (2022.01)
(Continued)

(52) U.S. Cl.
CPC ............ *H04L 63/04* (2013.01); *H04L 9/0827* (2013.01); *H04L 41/22* (2013.01); *G06F 3/0484* (2013.01)

(58) Field of Classification Search
None
See application file for complete search history.

(56) References Cited

U.S. PATENT DOCUMENTS 6,738,076 B1 5/2004 Mandavilli et al.
8,374,592 B2 * 2/2013 Proctor, Jr. ........ G06Q 30/0207 455/414.3
(Continued)

FOREIGN PATENT DOCUMENTS

EP 3203365 A1 8/2017
KR 20150113804 A * 3/2014 ............ G06F 15/16
(Continued)

OTHER PUBLICATIONS

"International Search Report and Written Opinion Issued in PCT Application No. PCT/US21/058022", Mailed Date: Mar. 3, 2022, 13 Pages.
(Continued)

*Primary Examiner* — William L Bashore
*Assistant Examiner* — Koorosh Nehchiri

(57) ABSTRACT

The present disclosure provides a system that controls an interim connection between two computing devices. The system first determines if a person if physically present at the host device by detecting an interaction with an input device attached to the host device. In response to the input, the system generates a connection identifier that is displayed at the host device. The display of a graphical element for communicating the connection identifier enables the guest device to receive the connection identifier. The graphical element can be a Quick Response (QR) code, bar code, text, etc. The guest device can send a connection request to the server using the connection identifier. In response to the request, the server verifies the connection identifier and establishes a data connection between the host device and the guest device. Data can be exchanged between the host device and the guest device via the server.

20 Claims, 10 Drawing Sheets

(51) Int. Cl.
*H04L 9/08* (2006.01)
*H04L 41/22* (2022.01)

(56) References Cited

U.S. PATENT DOCUMENTS 8,610,730 B1* 12/2013 Li ........................ H04N 21/432 345/520
8,775,844 B1 7/2014 Peterson
8,823,494 B1* 9/2014 Kovitz .................. H04W 12/50 398/128
9,010,627 B1* 4/2015 Prasad ................. G06Q 20/202 235/379
9,280,515 B2* 3/2016 Gaede ................ H04N 21/8352
9,477,820 B2* 10/2016 Levin ................. G06Q 30/0185
9,729,380 B1 8/2017 Chung
10,462,831 B2 10/2019 Melman
10,769,625 B2* 9/2020 Pandiarajan ....... G06Q 20/3274
10,832,476 B1 11/2020 Nussbaum et al.
10,839,369 B1 11/2020 Mossoba
10,915,593 B2* 2/2021 David .............. G06K 19/06037
11,271,940 B1 3/2022 Belli et al.
2012/0042099 A1 2/2012 Wong et al.
2012/0138671 A1* 6/2012 Gaede ................. G06F 16/9554 235/375
2012/0317628 A1* 12/2012 Yeager ................. G06Q 20/352 726/5
2013/0031453 A1 1/2013 Griffiths et al.
2013/0085941 A1 4/2013 Rosenblatt
2013/0124411 A1* 5/2013 Kobres .................. G06Q 40/02 235/379
2013/0124855 A1* 5/2013 Varadarajan ............ G07F 19/20 726/4
2013/0251149 A1 9/2013 Xu
2013/0262309 A1* 10/2013 Gadotti .............. G06Q 20/3274 705/44
2013/0278622 A1* 10/2013 Sun ...................... G06Q 20/325 345/589
2014/0092127 A1 4/2014 Kruglick
2014/0143674 A1 5/2014 Kruglick
2014/0197232 A1* 7/2014 Birkler .................... H04L 63/08 235/375
2014/0241523 A1 8/2014 Kobres
2014/0333509 A1 11/2014 Yuann et al.
2014/0358777 A1 12/2014 Gueh
2015/0178721 A1* 6/2015 Pandiarajan ..... G06K 19/06112 705/64
2015/0244699 A1 8/2015 Hessler
2015/0249663 A1* 9/2015 Svigals ................. H04W 12/08 726/7
2016/0042602 A1 2/2016 Phan
2016/0117735 A1 4/2016 Mongeau
2016/0239251 A1 8/2016 Mcgibney et al.
2016/0353406 A1 12/2016 Gianoukos et al.
2016/0381114 A1* 12/2016 Best ........................ H04W 4/21 455/411
2017/0039770 A1* 2/2017 Lanier ................... H04W 12/06
2017/0177290 A1 6/2017 Dow et al.
2017/0193001 A1 7/2017 Agrawal et al.
2017/0238174 A1* 8/2017 Cech ..................... H04L 63/107 455/411
2017/0280327 A1 9/2017 Masuoka et al.
2018/0189255 A1 7/2018 Kofman et al.
2018/0247287 A1* 8/2018 Narasimhan ....... G06Q 20/3276
2018/0330371 A1* 11/2018 Tadiparti .......... G06Q 20/38215
2018/0332049 A1* 11/2018 Zhang ................. H04W 12/084
2019/0020479 A1 1/2019 Antipa
2020/0012777 A1* 1/2020 Goodsitt ............... H04L 9/3234
2020/0014977 A1* 1/2020 Sato ................... H04N 21/4821
2020/0065052 A1 2/2020 Lewbel
2020/0213403 A1* 7/2020 Yang ....................... H04L 67/02
2020/0304990 A1* 9/2020 Azam ................... H04L 63/101
2020/0314385 A1 10/2020 Kang et al.
2020/0356241 A1 11/2020 Al Majid et al.
2020/0371673 A1 11/2020 Faulkner
2020/0380493 A1 12/2020 Morales
2020/0412712 A1* 12/2020 Murata ............... H04L 63/0838
2021/0099488 A1 4/2021 Schrager et al.
2022/0207113 A1 6/2022 Popkave et al.
2022/0210262 A1 6/2022 Popkave et al.
2023/0161848 A1 5/2023 Popkave et al.

FOREIGN PATENT DOCUMENTS

KR 20150015929 A * 2/2015 ......... H04L 63/0869
WO 2014047131 A1 3/2014
WO 2018080491 A1 5/2018

OTHER PUBLICATIONS

"International Search Report and Written Opinion Issued in PCT Application No. PCT/US21/062290", Mailed Date: Mar. 3, 2022, 14 Pages.

"Non Final Office Action Issued In U.S. Appl. No. 17/137,214", Mailed Date: Jun. 23, 2021, 11 Pages.

"International Search Report and Written Opinion Issued in PCT Application No. PCT/US21/013335", Mailed Date: Aug. 31, 2021, 10 Pages.

"Non Final Office Action Issued in U.S. Appl. No. 17/137,271", Mailed Date: Mar. 30, 2022, 27 Pages.

"Notice of Allowance Issued in U.S. Appl. No. 17/137,214", Mailed Date: Apr. 28, 2022, 6 Pages.

Non-Final Office Action mailed on Dec. 19, 2023, in U.S. Appl. No. 18/056,412, 21 pages.

Communication pursuant to Article 94(3) EPC, Received for European Application No. 21820030.1, mailed on Jan. 2, 2025, 4 pages.

Notice of Allowance Issued in U.S. Appl. No. 17/137,214, Mailed Date: Mar. 7, 2022, 8 Pages.

Final Office Action mailed on Sep. 24, 2024, in U.S. Appl. No. 18/056,412, 15 pages.

Communication under Rule 71(3) EPC, Received for European Application No. 21820030.1, mailed on Aug. 7, 2025, 07 pages.

Non-Final Office Action mailed on Feb. 26, 2025, in U.S. Appl. No. 18/056,412, 13 pages.

Decision to grant a European patent pursuant to Article 97(1) received in European Application No. 21820030.1, mailed on Dec. 4, 2025, 2 Pages.

Final Rejection mailed on Jun. 2, 2026, in U.S. Appl. No. 18/056,412, 16 pages.

Joy, et al., "Enhanced Security Mechanism for ATM Machines", 7th International Conference on Advanced Computing and Communication Systems (ICACCS), vol. 1, 2021, pp. 302-306.

Communication pursuant to Article 94(3) Received in European Patent Application No. 21704116.9, mailed on Oct. 29, 2025, 06 pages.

Non-Final Office Action mailed on Oct. 16, 2025, in U.S. Appl. No. 18/056,412, 13 pages.

* cited by examiner

INTERIM CONNECTIONS FOR PROVIDING SECURE COMMUNICATION OF CONTENT BETWEEN DEVICES

BACKGROUND

There are a number of existing security models that enable computing devices to share information. Such systems utilize a number of different mechanisms that involve identities, passwords, and other types of credentials that allow devices to securely share content. Although these systems are beneficial for a number of specific applications in traditional services, these systems still have a number of drawbacks. For example, additional systems that utilize identities and passwords require a considerable amount of computing resources for managing those credentials. In some situations, existing systems utilizing these types of credentials also require specific applications on a client device. Such requirements can greatly hinder an adoption rate of a service in addition to increasing the amount of overhead and operational costs.

In view of the foregoing, it can be appreciated that there is a continual need to develop security models that allow devices to operate efficiently while communicating data between devices. In addition, there is a continual need to develop security models that enable devices to communicate data between devices without requiring specific applications or requiring the management of credentials.

SUMMARY

The above deficiencies and other problems associated with existing systems are reduced or eliminated by the introduction of interim connections that provide secure communication of content between a guest device and a host device using a server. The server first determines if a person is physically present at the host device by detecting an interaction with an input device attached to the host device. In response to the input, the server generates a connection identifier that is displayed at the host device. The display of a graphical element for visually communicating the connection identifier enables the guest device to receive the connection identifier. The graphical element can be a Quick Response (QR) code, bar code, text, etc. The host device can also use light-based, radio-based, or audio-based signals for communicating the connection identifier from the host device to the guest device. The guest device can then send a connection request to the server using the connection identifier and any other network address information provided by the host device. In response to the request, the server verifies the connection identifier and establishes a data connection between the host device and the guest device. Data can be exchanged between the host device and the guest device via the server. The server functions as a relay between a host device and a guest device. For instance, when the guest device sends content to the host device, the server receives the content from the guest device and relays the content to the host device. The server performs the relay of the content without storing a local copy. When the interim connection is terminated, the server controls the use of the connection identifier in future requests for connections with the host device. The server can prevent future use of a connection identifier or the server can limit the use of a particular connection identifier to certain intervals of time.

In some embodiments, the system can also allow the guest device to share content with the host device for display on a screen of the host device. The content can be persistently displayed on a screen of the host device when the host device is in a predetermined operating mode, e.g., a lock screen or a bulletin board mode. The security models provided herein enable the content, which is also referred to herein as fridge magnets, to be securely displayed in a particular environment, e.g., postings, enterprise messages, etc.

The techniques disclosed herein provides enhanced security in a number of ways. For example, by having a server manage the interim connection, the system does not need to share network address information for a host device. In particular, a network address of the host device does not need to be shared with the user's guest device. In addition, by granting a data connection using an input that verifies that a person is physically present at the host device, the system can generate an identifier that does not require user identities and passwords. This can reduce the use of computing resources and other resources that are needed to manage those type of user credentials. In addition, since the complexities of managing credentials are not needed in the disclosed system, the disclosed techniques can also improve the usability and adoption rate of a service provided by the server and the host device. The disclosed techniques can also improve the adoption rate of a system by allowing guest devices access to a system by using generic browser applications to initiate data connections instead of complex, specialized applications.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
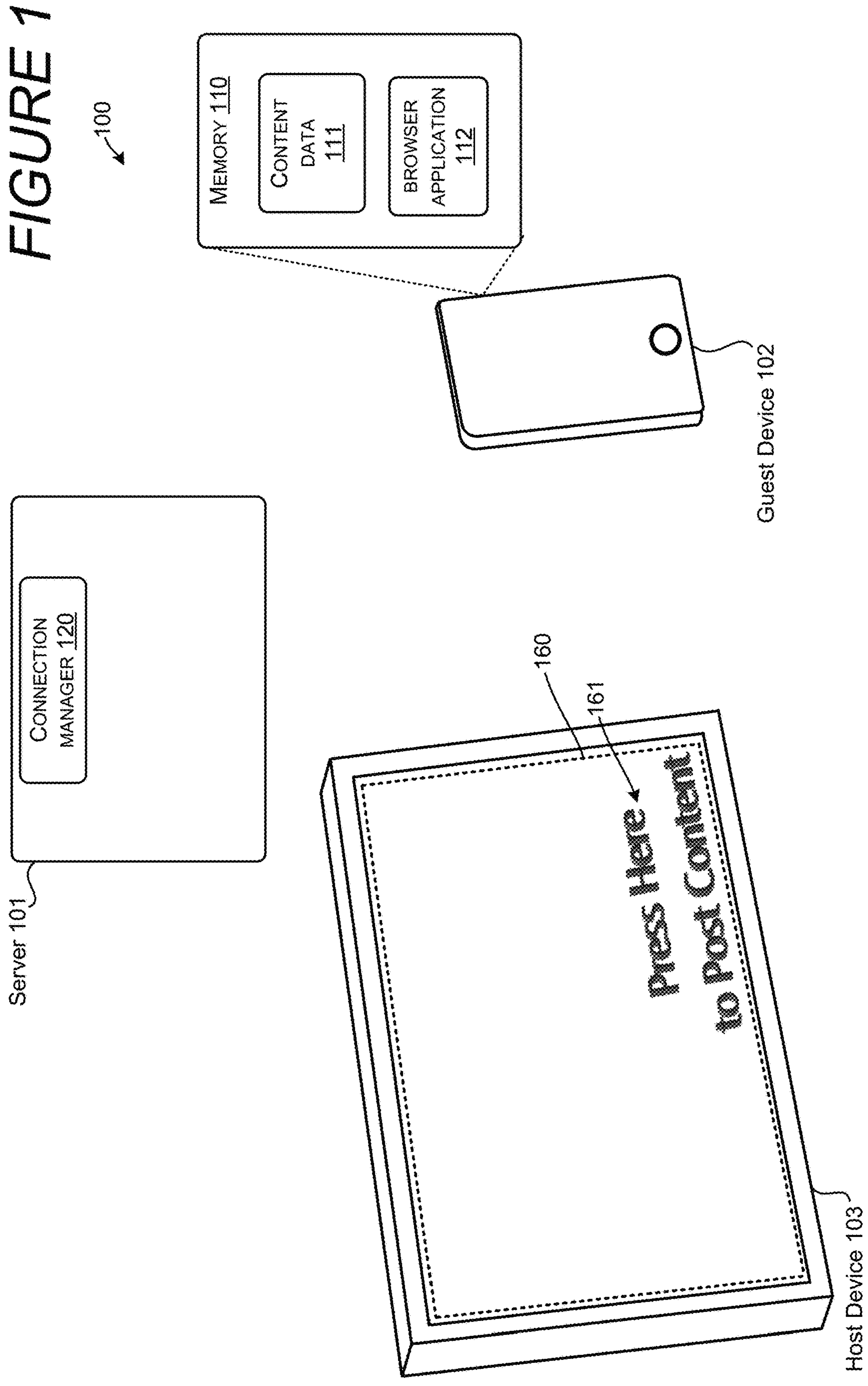
FIG. 1 is a block diagram of a system of computing devices for facilitating interim connections.

FIG. 1 is a block diagram of a system 100 of computing devices for facilitating interim connections using a relay server. In this example, the system 100 comprises a server 101, a guest device 102, and a host device 103. The guest device 102 can comprise memory 110 including content data 111 and an application, such as a browser application 112. In some configurations, a server 101 functions as a data relay between the guest device 102 and the host device 103. A data connection between the guest device 102 and the host device 103 can be initiated by a user interaction with the host device. This enables the system 100 to determine if a user associated with the guest device 102 is physically present at the host device 103. The system can determine if the user is physically located in proximity to the host device 103 using a number of techniques. In one illustrative example, the host device 103 can display a graphical element 161 prompting the user to provide an input directly to the host device 103. In other embodiments, the host device can also require the user to provide a voice input captured by a microphone of the host device 103 or a gesture input captured by a camera in communication with the host device. In response to the user input, the server 101 generates a connection identifier that is used to initiate a network connection between the guest device 102 and the host device 103. As described in more detail below, by the use of a relay at the server, the system to initiate and manage a bidirectional network connection without requiring the host device 103 to share network information, such as an IP address, with the guest device 102. In addition, the disclosed techniques enable the guest device to communicate data with the host device without requiring the guest device to download specialized applications.

In one illustrative example, a computer implemented method includes operations causing a display of a user interface 160 on a display screen 115 of the host device 103. The user interface 160 can include a graphical element 161 indicating the availability of functionality to receive content data 111 at the host device 103 from the guest device 102. The graphical element 161 can be configured to prompt the user for an input. For example, a user interface can have a selectable element with text "Press Here to Post Content." The graphical element 161 can also be configured with other forms of media, e.g., other indicia or video data, indicating the availability of functionality for receiving content at the host device from a guest device. The graphical element 161 can be configured to receive the user input if the display screen 115 is a touchscreen. In some configurations, the host device 103 can also be configured to receive an input using a camera, a mouse, a keyboard, etc.

Figure 2:
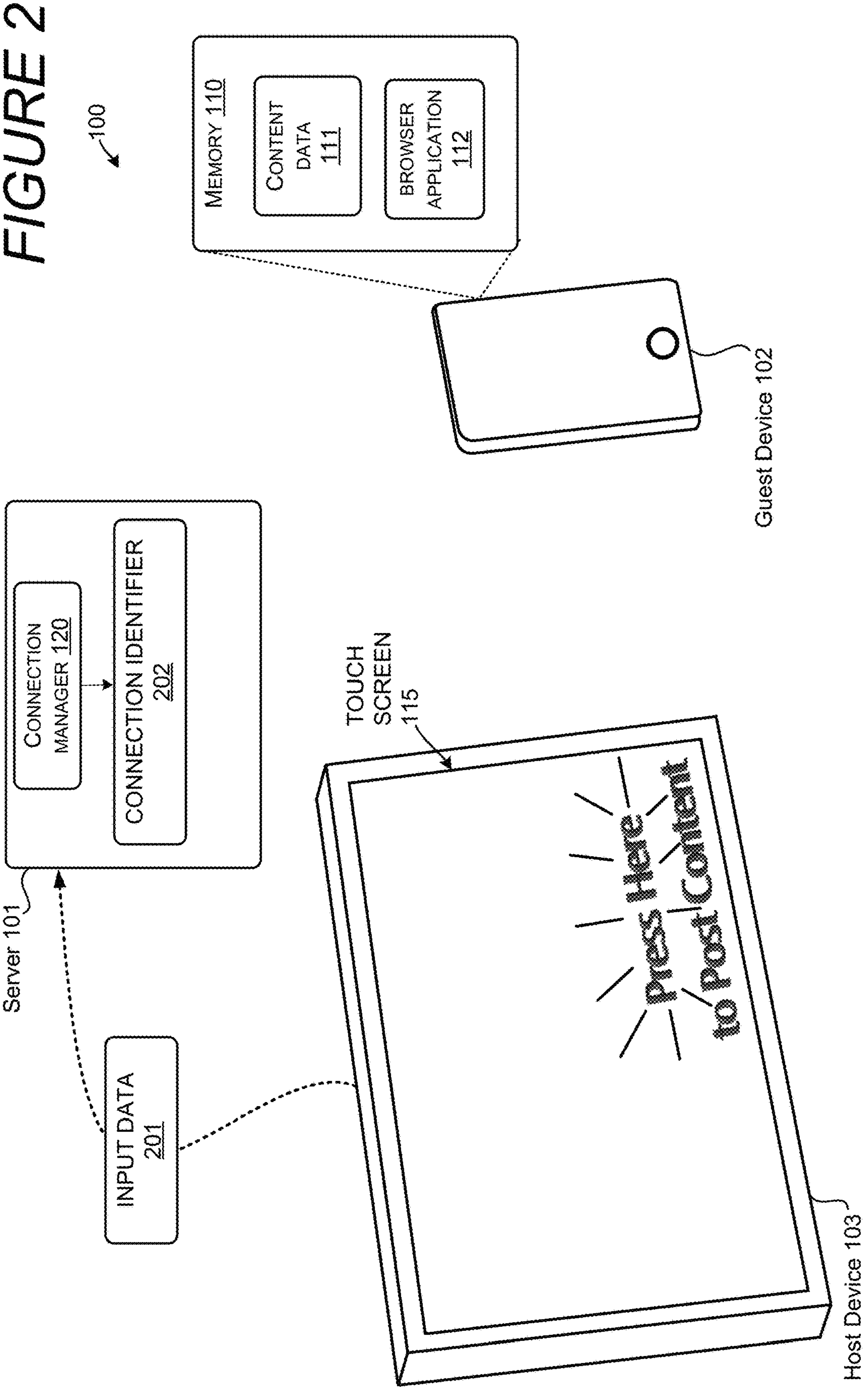
FIG. 2 illustrates a first phase of a process involving an input at a host device for establishing an interim connection.

As shown in FIG. 2, in response to a user input, the system can cause the generation of a connection identifier 202. In this example, the user input at the host device 103 causes the generation of input data 201 confirming that a user is physically present at the host device 103. The input data 201 indicating the user input can be communicated from the host device 103 to the server 101. In response, the server 101 generates the connection identifier 202. The connection identifier 202 configured to enable the server 101 to establish an interim connection between the guest device 102 and the host device 103.

Figure 3:
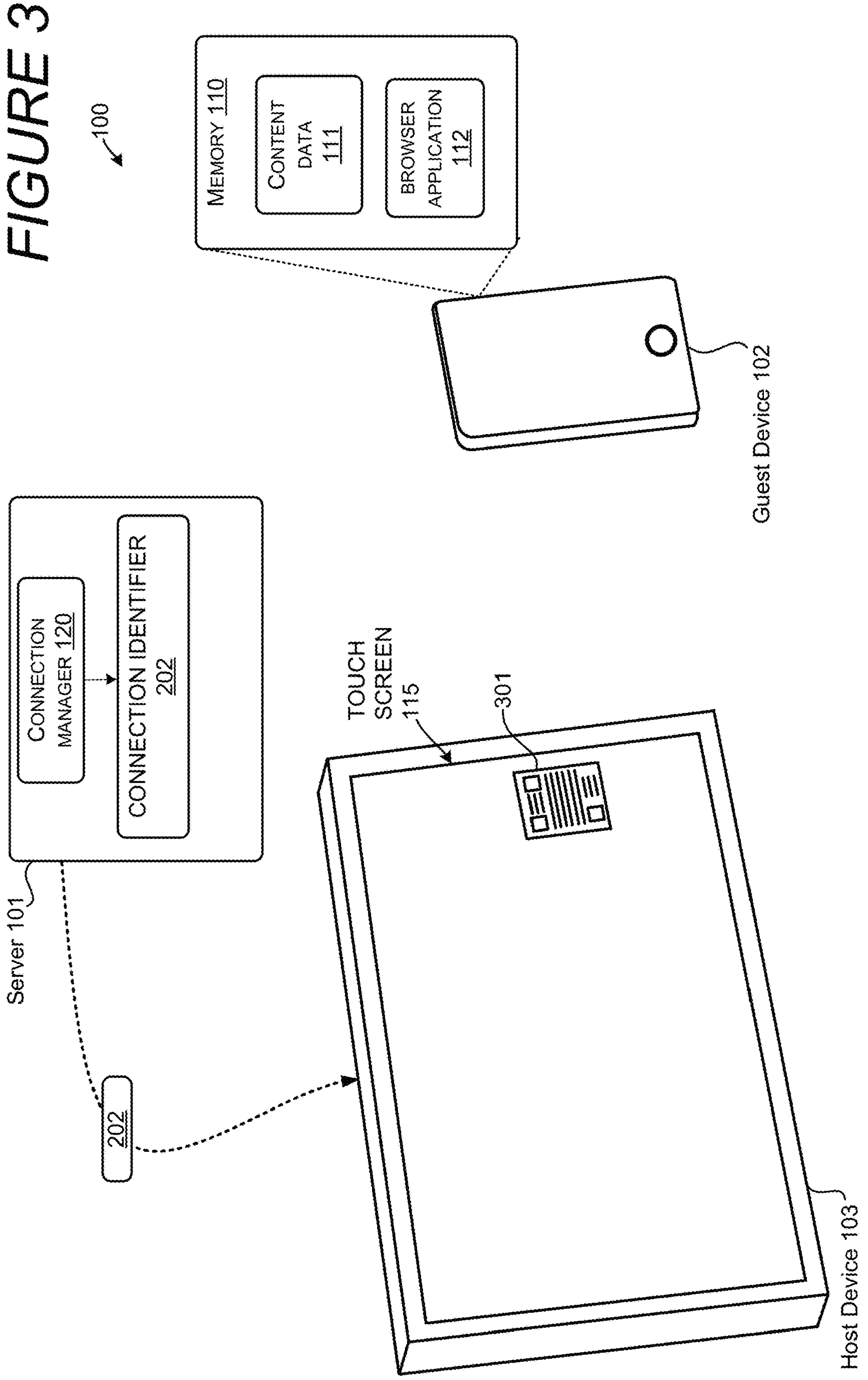
FIG. 3 illustrates a second phase of a process involving generation of a connection identifier for establishing an interim connection.

As shown in FIG. 3, the connection identifier 202 is sent from the server 101 to the host device 103. In some configurations, the connection identifier 202 is displayed in the form of a graphical element 301 on a screen 115 of the host computer 103. The graphical element 301 can be configured to visually convey the connection identifier 202 to the user. The display of a graphical element for visually communicating the connection identifier enables the guest device to receive the connection identifier by the use of a camera. The graphical element can be a Quick Response (QR) code, bar code, text, and/or a combination thereof.

The graphical element 301 can also visually communicate an encryption key. Thus, when camera of the guest device 102 is directed to the graphical element 301, the guest device 301 can obtain the connection identifier 202 and one or more encryption keys either encoded within the graphical element 301 or communicated via other methods disclosed herein. In one example, the encryption keys can be used for encrypting the content data communicated between the guest device and the host device. This can be configured such that the server 101 is not able to retrieve or interpret the communicated content data.

Although this example illustrates an embodiment where the connection identifier 202 is displayed in the graphical element 301, the connection identifier 202 can be communicated to the guest device 102 using other techniques. For instance, the guest device 103 can generate an audio signal and an audible output for communicating the connection identifier 202 to the host device 103. Thus, a guest device 102 that is in proximity to the host device 103 can readily capture the audible output using a microphone, and the audible output can communicate the connection identifier 202. In another embodiment, the host device 103 can generate other types of signals that communicate the connection identifier 202, e.g., light or other modulated signals for communicating the connection identifier 202 from the host device 103 to the guest device 102.

Figure 4:
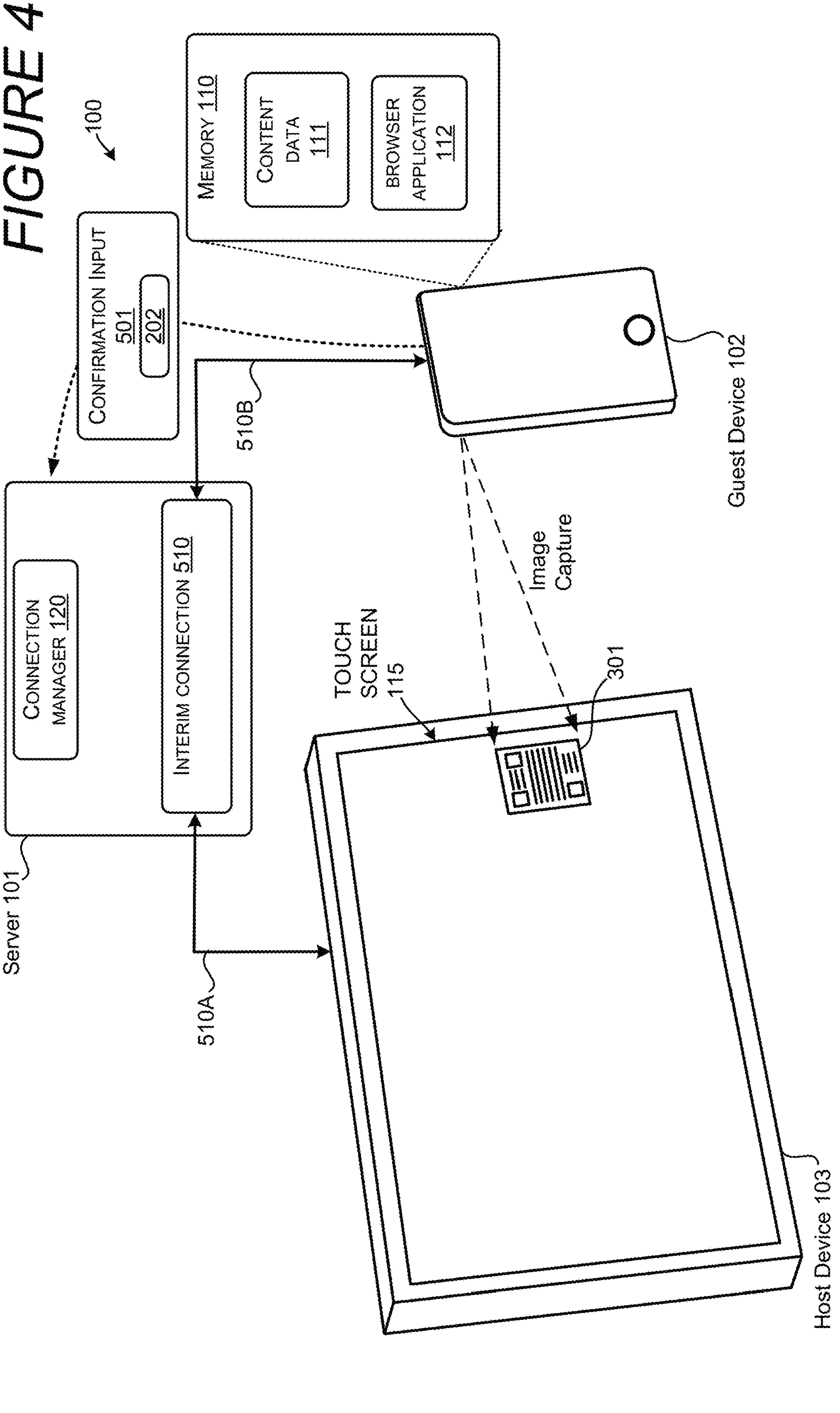
FIG. 4 illustrates a third phase of a process for establishing an interim connection in response to a request from a guest device.

As shown in FIG. 4, the guest device 102 can obtain the connection identifier 202 and use the connection identifier 202 to establish the interim connection 510 with the server 101. In one illustrative example, the guest device 102 can capture the connection identifier 202 by the use of a camera that is directed to the graphical element 301 displayed by the host computer 103. Although this example utilizes a graphical element for communicating the connection identifier, the guest device can obtain the connection identifier from the host device using any suitable communication means such as, but not limited to, an audible sound generated by the host device and captured by a speaker of the guest device, a light signal generated by the host device and captured by a sensor of the guest device, or by the use of any other communication protocol, e.g., NFC, Bluetooth, Wi-Fi, etc.

Once the guest device 102 obtains the connection identifier 202, the guest device 102 can send a confirmation input 501 that includes the connection identifier 202 to the server 101. The confirmation input 501 can be sent using a generic application, such as a browser, for communicating data, such as the confirmation input 501, using a URL that is communicated to the guest device along with the confirmation input 501. The confirmation input 501 then causes the server 101 to establish the interim connection 510 between the guest computer 102 and the host computer 103 through the server 101.

In some embodiments, the interim connection 510 can comprise two components, a first connection 510A between the server 101 and the host device 103, and a second connection 510B between the server 101 and guest device 102. The first connection and the second connection can be established and maintained independently. However, once the first connection and the second connection are operating, they can be used to communicate data between the host device and the guest device with the server functioning as a relay. The first connection can be established before the second connection is established. For example, the first connection can be established when the host device 103 receives the user input and sends the input data 201. The second connection can be established in response to the confirmation input 501. The second connection can be terminated while the first connection is maintained.

The confirmation input 501 can be generated by a generic application, such as the browser application 112. Thus, in some embodiments, other metadata can be communicated to the guest device 102 along with the communication of the connection identifier 202. In one illustrative example, the graphical element 301 on a screen 115 of the host computer 103 can also include data defining a URL. The URL can include the address of the server 101. Thus, when the guest device 102 captures the data embedded in the graphical element 301, the guest device 102 can utilize an application, such as the browser application 112, to send the confirmation input 501 including the connection identifier 202 to the server 101. The connection identifier 202 can be communicated from the host device to the guest device using a number of different techniques, including light-based signals, radio-based signals, or sound-based signals. These techniques can also be limited to a predetermined distance so as to provide some assurance that the user associated with the guest device is located near the host device.

Figure 5:
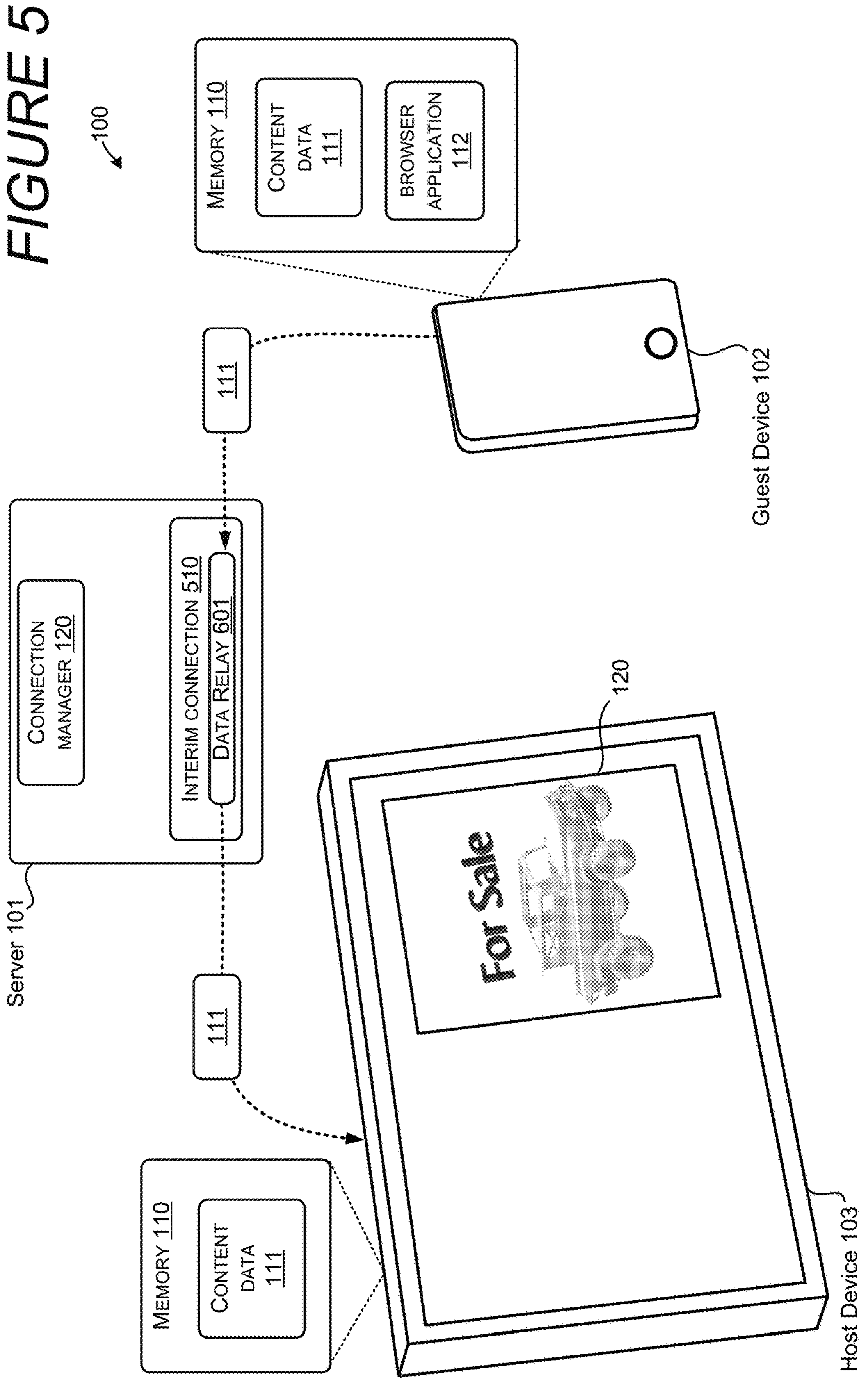
FIG. 5 illustrates a phase of a process using an interim connection to communicate content data from a guest device to a host computing device.

When the guest device sends the confirmation input 501, e.g., a connection request, to the server using the connection identifier, the server can verify the connection identifier with a data store of valid connection identifiers. As shown in FIG. 5, once the server 101 verifies that the connection identifier 202 is valid, the server establishes a data connection, e.g., the interim connection 510, between the host device 103 and the guest device 102. Data, such as the content data 111, can be exchanged between the host device and the guest device via the server. For instance, when the guest device transmits content data, the server receives the content data from the guest device and relays the content to the host device. The server performs the relay of the content without storing a local copy. Thus, the interim connection 510 can enable secure delivery of the content data 111 from the guest computer 102 to the host computer 103.

In response to the receipt of the content data 111, the host computer 103 display a rendering 120 of the content data 111. In some configurations, the rendering 120 of the content data 120 is automatically displayed in response to detecting that the host computer 103 is in the predetermined state. A predetermined state can include a lock screen mode, a bulletin board mode, or an operating mode after an application is closed, wherein the rendering of the content data is persistently displayed until the computing device receives a command to remove the rendering of the content data or detects an until the computing device exits from the predetermined state.

In some configurations, the host device can configure permissions, where the permissions cause the rendering 120 of the content 111 to be automatically displayed when the host device is in a predetermined state. In some configurations, the predetermined state may include a state where the host device is running less than a threshold number of applications in a foreground process, e.g., applications that are displaying a user interface on a device desktop. In some configurations, the predetermined state may include a state where the host device is in a Hub mode, a multi-user or open user mode where people can interact with a touch screen to modify content, like a bulletin board or refrigerator with modifiable magnets. In some configurations, the predetermined state may include a state where the host device is in a lock screen mode, where a password is needed to enter full functionality of an operating system but in the locked screen mode configured to allow users to manipulate and remove a select set of renderings 120 of the content data 111.

Figure 6:
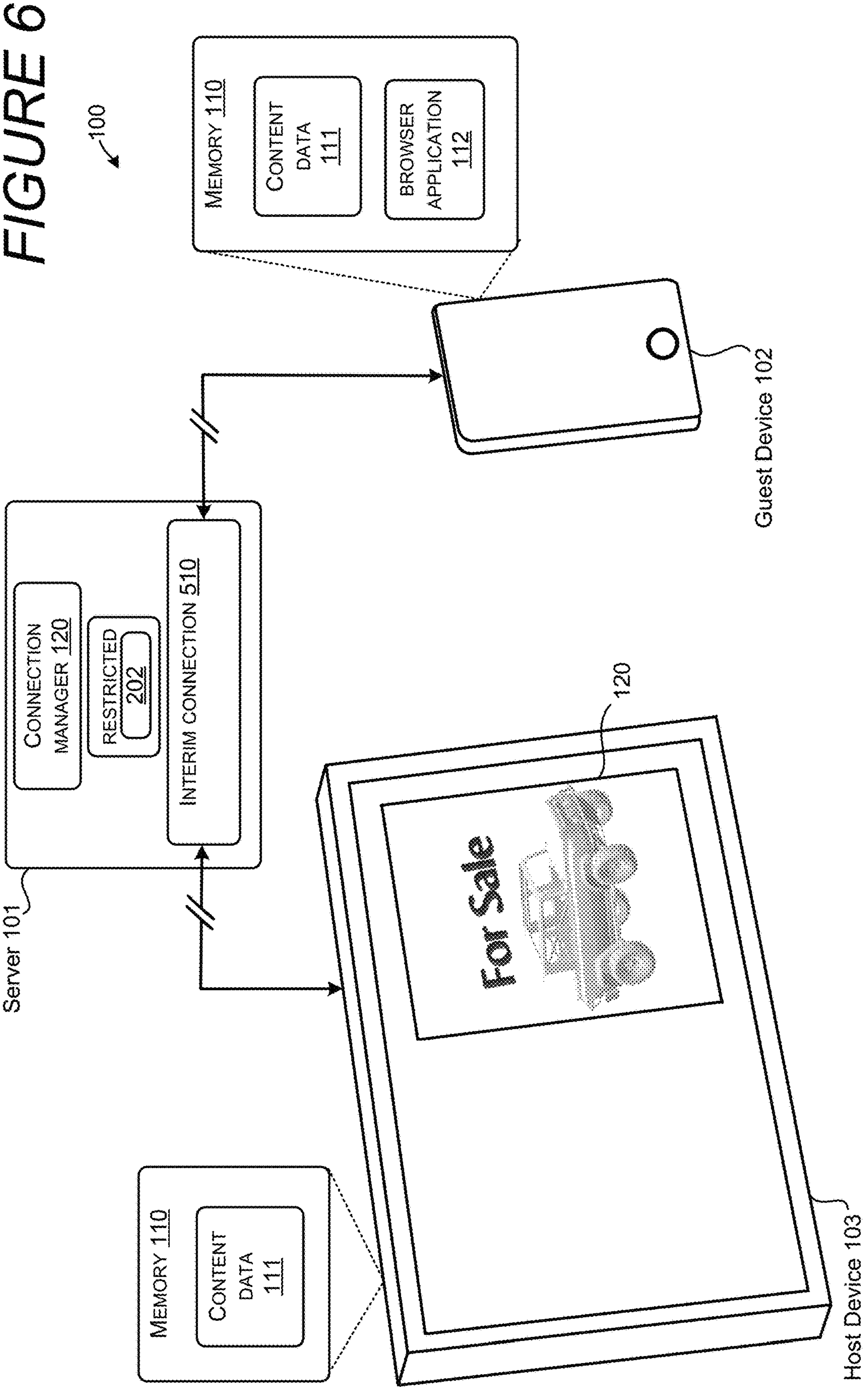
FIG. 6 illustrates the termination of the interim connection based on one or more events.

As shown in FIG. 6, the server 101 can terminate the interim connection 510 in response to a detection of one or more events at the server 101. The one or more events can include, but are not limited to, a user input at the guest device 102 requesting termination of the connection, a timeout event that is invoked after a predetermined period of time has elapsed after a data rate between the devices has dropped below a threshold, or a completion of a data transfer. When the interim connection 510 is terminated, the server 101 regulates the use of the connection identifier 202 associated with the interim connection 510. Thus, subsequent processes for generating prevent or reduce occurrences where one or more new connection identifiers are identical to the connection identifier 202.

Figure 7:
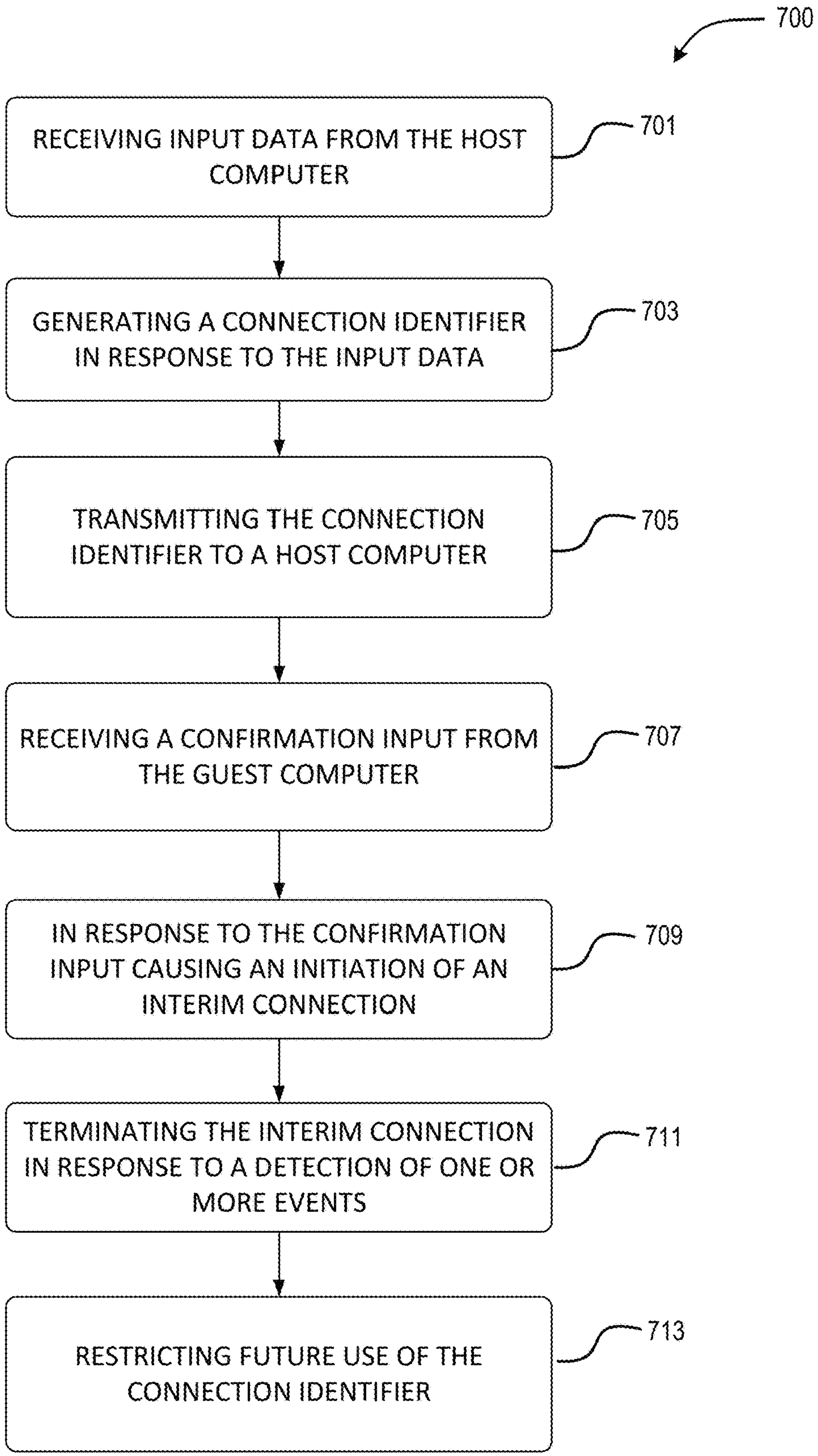
FIG. 7 is a flow diagram showing aspects of a routine for establishing, utilizing and terminating an interim connection.

FIG. 7 is a flow diagram illustrating aspects of a routine 700 for enabling aspects of the present disclosure. It should be appreciated that the logical operations described herein with regard to FIG. 7, and the other figures, can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

For example, the operations of the routine 700 can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 700 may be also implemented in many other ways. For example, the routine 700 may be implemented, at least in part, by a processor of another remote computer, processor or circuit. In addition, one or more of the operations of the routine 700 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

The routine 700 begins at operation 701 where a computing device, such as the server, receives input data 201 confirming an interaction between a user and a host computer 103. The input data 201 can be generated in response to user input received at the host device 103. The input data can be communicated from the host device to the server. In operation 701, the host device 103 can initiate a first connection with the server for communicating the input data. This first connection can be utilized throughout the routine to facilitate and manage the interim connection with the guest device 102.

Next, at operation 703 and shown in FIG. 2, the connection identifier 202 can be generated in response to receiving the input data at the server 101. The connection identifier 202 is configured to establish the interim connection between the guest device 102 and the host computer 103 through the server 101. As described herein, and shown in FIG. 2, the connection identifier 202 can be generated in response to a user input received at the host device 103.

In some configurations, operation 701 can involve a process where the system verifies that an input was provided by a user located at the host computer. For instance, the routine can involve a process where the system verifies that an input was provided by an input device located at the host computer. During an initialization process, the server 101 can receive hardware data identifying an input device such as a keyboard or touchpad type, e.g., a model number or serial number. The input device can be associated with a hardware identifier indicating the device type. This information can be communicated to the server when a host device 103 is in a registration process with the server. This registration process can occur before operation 701, e.g., the hardware data is communicated to the server prior to the display of the user interface and the prompt for a user input. Thus, when the user input occurs, the host device 103 can send the hardware data to the server for confirming that the user input was generated by the same input device that sent hardware data during the registration process. By enabling the server 101 to verify that a hardware identifier communicated in the registration process matches the hardware identifier sent in conjunction with the input data, the system can detect when a user sends spoofing input data in an effort to appear that they are physically located at the host device.

Next, at operation 705, the computing device can cause a transmission of the connection identifier 202 from the server 101 to the host computer 103. The transmission of the connection identifier 202 can cause a display of a graphical element 301 on a screen 115 of the host computer 103. The graphical element 301 is configured for visually conveying the connection identifier 202 in the display of the graphical element 301. The graphical element can also indicate a URL for the server. This display enables the communication of connection identifier 202 and any network address data of the server to the guest device 102. Once the guest device obtains the connection identifier and the URL, the guest device can send a confirmation input 501 to the server.

This is shown in FIG. 3, where the connection identifier is sent from the server to the host computer for display. In addition to the display of the graphical element, or as an alternative to the graphical element, the communication of the connection identifier can cause the host device to generate one or more signals that enable the host device to communicate the connection identifier to a guest device.

Next, at operation 707, and as shown in FIG. 4, the guest device can send a confirmation input from the server 101. The confirmation input 501 can include the connection identifier 202. The confirmation input by the one who can be delivered to the server 101 from the guest device 102 using the address information, e.g., a URL, provided by the host device.

Next, at operation 709, when the server receives the confirmation input 501 from the guest device 102, the confirmation input 501 causing the server 101 to establish the interim connection 510 between the guest computer 102 and the host computer 103 through the server 101. The interim connection is configured to allow the guest device 102 to exchange information with the host device 103. In one illustrative example, receipt of the confirmation input at the server can cause the server to establish a connection between the server and the guest device. This connection can be utilized with the connection that is already established between the server and the host device to enable a bidirectional communication exchange between the host device and the guest device.

For example, in some configurations, the interim connection can include a first connection between the guest computer and the server and a second connection between the host computer and the server, wherein the secure delivery of the content data from the guest computer to the host computer comprises communicating the content data from the guest computer to the server. The server relays the content data to the host computer in response to receiving the content data at the server, the server configured to restrict storage of the content data on a storage device controlled by the server. In some embodiments, the server can only handle the data in parts. Thus, if the server never sees all of the content data at one time, this may help preserve privacy.

Once the content is communicated between the guest device and the host device, the host device can display a rendering of the content data received from the guest device. In some configurations, the display of content is persistent when the computer is in predetermined modes, e.g., screen lock, a bulletin board mode, surface hub mode, etc. For instance, the rendering of the content data can be automatically displayed in response to detecting that the host computer is in a predetermined state, wherein the predetermined state comprises a lock screen mode, a bulletin board mode, or when the device closes one or more applications. The rendering of the content data can be persistently displayed while the device is in the predetermined state or until the computing device receives a command to remove the rendering of the content data.

Next, at operation 711 and as shown in FIG. 6, the server can terminate the interim connection 510 in response to a detection of one or more events at the server 101. The interim connection can be terminated in a number of different ways. For instance, a connection can be terminated manually, e.g., a user input at any device, upon completion of transferred content, or after a timeout period. In some embodiments, the one or more events causing the termination of the interim connection can include at least one of receiving a supplemental input from the guest computer requesting termination of the interim connection, determining that the interim connection has not been used for a predetermined time period, or determining that a predetermined amount of data has been communicate over the interim connection.

In some configurations, operation 711 may involve a process where the connection between the server and the guest device, or the connection between the host device and the guest device, is terminated in response to a detection that the user of the guest device and/or the guest devices is no longer in proximity to the host device. The host device can be in communication with a camera or a proximity sensor (such as a infrared sensor or a doppler sensor). The host device can be in communication with a radio device signal enabling the host device to determine when the guest device is within a predetermined distance to the host device. The sensor or the radio of the host device can provide a signal enabling the host device to determine when the user of the guest device, or when the guest device, is no longer in proximity to the host device, e.g., within a threshold distance to the host device, and in response terminate one or more connections described herein.

In such embodiments, before a connection to the guest device is established, the host device may also require that the person and/or the guest device is in proximity, e.g., when the guest device is within a threshold distance to the host device. Thus, before server and/or the host device makes a connection to the guest device, the host device may not allow the guest device to connect with the server and/or allow the guest device to connect with the host device if a sensor or radio of the host device detect that a user and/or the guest device is not in proximity to the host device. In other words, the host device may not allow the guest device to connect with the server and/or allow the guest device to connect with the host device if the host device determines that user and/or the guest device is outside a predetermined distance to the host device.

In some configurations, operation 711 may involve a process where the connection between the server and the guest device is terminated while the connection between the server and the host device are preserved. This enables the host device to communicate information with the server once the connection with the guest device is terminated. Termination of the connection between the server and the host device can be initiated by the host device or the server independently.

At operation 713, the server 101 can also regulate subsequent processes for generating new connection identifiers. In some embodiments, the server can control the subsequent processes to prevent or reduce occurrences where any newly generated connection identifiers are identical to the connection identifier 202. Thus, re-use of any connection identifier can be eliminated or delayed for a predetermined period of time.

Figure 8:
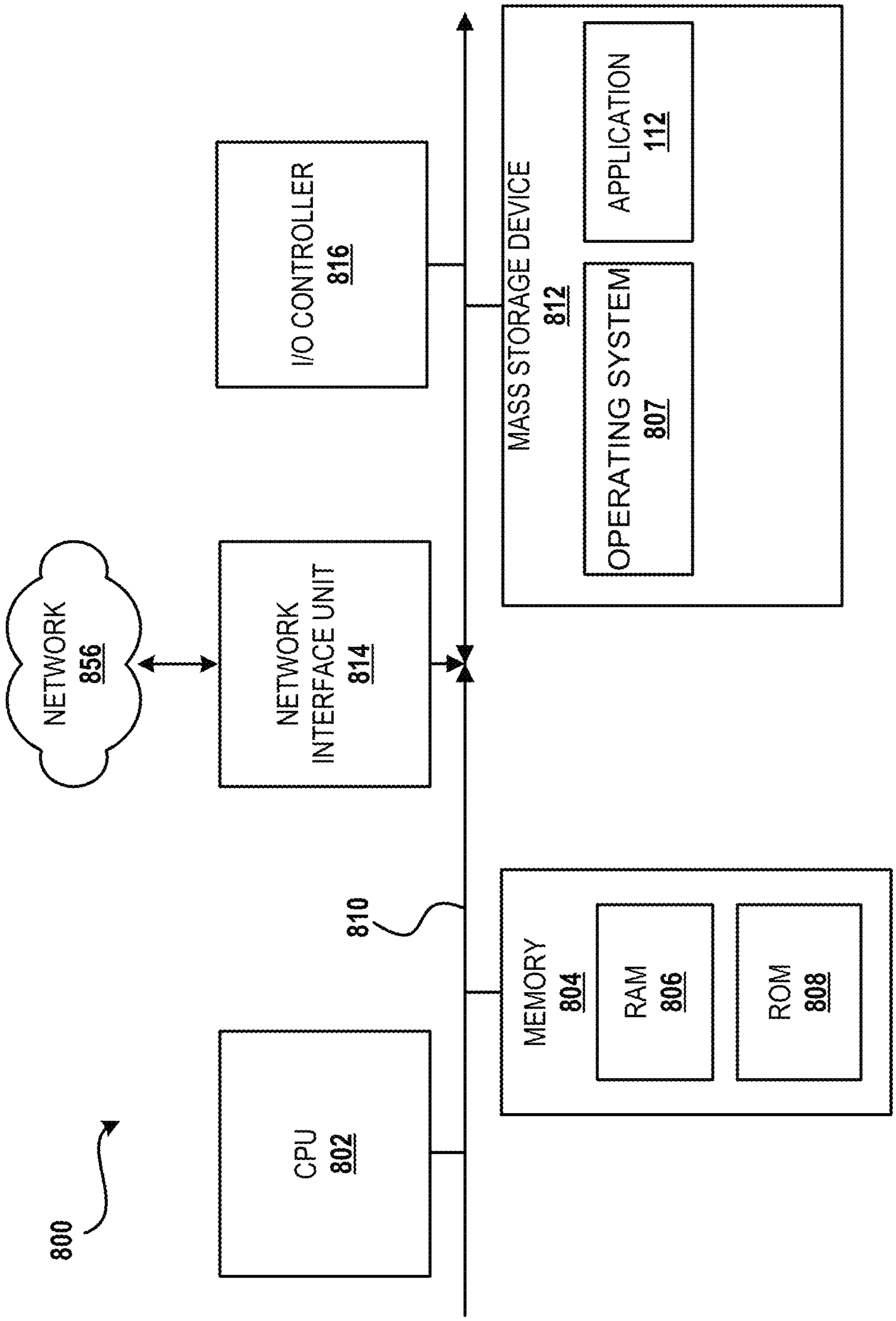
FIG. 8 is a computer architecture diagram illustrating an illustrative computer hardware and software architecture for a computing system capable of implementing aspects of the techniques and technologies presented herein.

FIG. 8 shows additional details of an example computer architecture 800 for a computer, such as the computing devices shown in FIG. 1, capable of executing the program components described herein. Thus, the computer architecture 800 illustrated in FIG. 8 illustrates an architecture for a server computer, a guest device, a host device, a mobile phone, a PDA, a smart phone, a desktop computer, a netbook computer, a tablet computer, and/or a laptop computer. The computer architecture 800 may be utilized to execute any aspects of the software components presented herein.

The computer architecture 800 illustrated in FIG. 8 includes a central processing unit 802 ("CPU"), a system memory 804, including a random-access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing an operating system 807, one or more application programs such as the application 112 in FIG. 1, and other data described herein.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media or a computer storage medium may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information, and which can be accessed by the computer architecture 800. For purposes of the claims, the phrase "non-transitory computer storage medium," "computer storage medium," "computer-readable storage medium" and variations thereof, does not include waves, signals, and/or other transitory and/or intangible communication media, per se.

According to various configurations, the computer architecture 800 may operate in a networked environment using logical connections to remote computers through the network 856 and/or another network (not shown in FIG. 8). The computer architecture 800 may connect to the network 856 through a network interface unit 814 connected to the bus 810. It should be appreciated that the network interface unit 814 also may be utilized to connect to other types of networks and remote computer systems. The computer architecture 800 also may include an input/output controller 816 for receiving and processing input from a number of other devices, including a keyboard, mouse, or electronic stylus (also not shown in FIG. 8). Similarly, the input/output controller 816 may provide output to a display screen, a printer, or other type of output device (also not shown in FIG. 8).

It should be appreciated that the software components described herein may, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all of the components shown in FIG. 8, may include other components that are not explicitly shown in FIG. 8, or may utilize an architecture completely different than that shown in FIG. 8.

Figure 9:
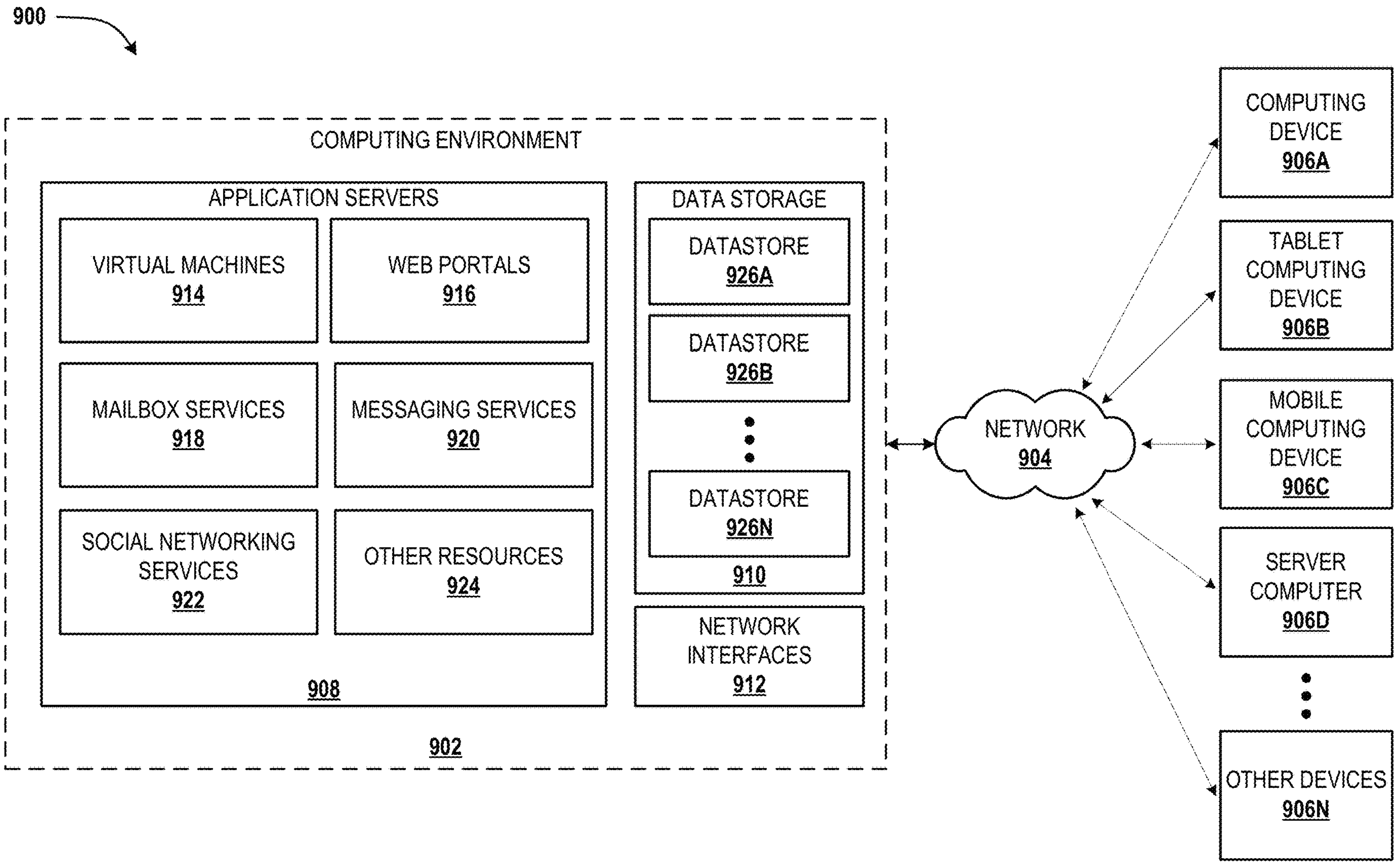
FIG. 9 is a diagram illustrating a distributed computing environment capable of implementing aspects of the techniques and technologies presented herein.

FIG. 9 depicts an illustrative distributed computing environment 900 capable of executing the software components described herein. Thus, the distributed computing environment 900 illustrated in FIG. 9 can be utilized to execute any aspects of the software components presented herein. For example, the distributed computing environment 900 can be utilized to execute aspects of the software components described herein.

According to various implementations, the distributed computing environment 900 includes a computing environment 902 operating on, in communication with, or as part of the network 904. The network 904 may be or may include the network 856, described above with reference to FIG. 8. The network 904 also can include various access networks. One or more client devices 906A-906N (hereinafter referred to collectively and/or generically as "clients 906" and also referred to herein as computing devices 906) can communicate with the computing environment 902 via the network 904 and/or other connections (not illustrated in FIG. 9). In one illustrated configuration, the clients 906 can include a computing device 906A such as a laptop computer, a desktop computer, or other computing device; a slate or tablet computing device ("tablet computing device") 906B; a mobile computing device 906C such as a mobile telephone, a smart phone, or other mobile computing device; a server computer 906D; and/or other devices 906N. It should be understood that any number of clients 906 can communicate with the computing environment 902. Two example computing architectures for the clients 906 are illustrated and described herein. It should be understood that the illustrated clients 906 and computing architectures illustrated and described herein are illustrative and should not be construed as being limited in any way. The clients can each be a host device or a guest device.

In the illustrated configuration, the computing environment 902 includes application servers 908, data storage 910, and one or more network interfaces 912. According to various implementations, the functionality of the application servers 908 can be provided by one or more server computers that are executing as part of, or in communication with, the network 904. The application servers 908 can host various services, virtual machines, portals, and/or other resources. In the illustrated configuration, the application servers 908 host one or more virtual machines 914 for hosting applications or other functionality. According to various implementations, the virtual machines 914 host one or more applications and/or software modules for enabling aspects of the present disclosure. It should be understood that this configuration is illustrative and should not be construed as being limiting in any way. The application servers 908 also host or provide access to one or more portals, link pages, Web sites, and/or other information ("web portals") 916.

According to various implementations, the application servers 908 also include one or more mailbox services 918 and one or more messaging services 920. The mailbox services 918 can include electronic mail ("email") services. The mailbox services 918 also can include various personal information management ("PIM") and presence services including, but not limited to, calendar services, contact management services, collaboration services, and/or other services. The messaging services 920 can include, but are not limited to, instant messaging services, chat services, forum services, and/or other communication services.

The application servers 908 also may include one or more social networking services 922. The social networking services 922 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 922 are provided by or include the FACEBOOK social networking service, the LINKEDIN professional networking service, the MYSPACE social networking service, the YAMMER office colleague networking service, and the like. In other configurations, the social networking services 922 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Washington. Other services are possible and are contemplated.

The social networking services 922 also can include commenting, blogging, and/or micro blogging services. Examples of such services include, but are not limited to, the YELP commenting service, the TWITTER messaging service, and/or other services. It should be appreciated that the above lists of services are not exhaustive and that numerous additional and/or alternative social networking services 922 are not mentioned herein for the sake of brevity. As such, the above configurations are illustrative, and should not be construed as being limited in any way. According to various implementations, the social networking services 922 may host one or more applications and/or software modules for providing the functionality described herein. For instance, any one of the application servers 908 may communicate or facilitate the functionality and features described herein. For instance, a social networking application, mail client, messaging client or a browser running on a phone or any other client 906 may communicate with a social networking service 922 and facilitate the functionality, even in part, described above with respect to FIG. 9. Any device or service depicted herein can be used as a resource for supplemental data, including email servers, storage servers, etc.

As shown in FIG. 9, the application servers 908 also can host other services, applications, portals, and/or other resources ("other resources") 924. The other resources 924 can include, but are not limited to, document sharing, rendering or any other functionality. It thus can be appreciated that the computing environment 902 can provide integration of the concepts and technologies disclosed herein with various mailbox, messaging, social networking, and/or other services or resources.

As mentioned above, the computing environment 902 can include the data storage 910. According to various implementations, the functionality of the data storage 910 is provided by one or more databases operating on, or in communication with, the network 904. The functionality of the data storage 910 also can be provided by one or more server computers configured to host data for the computing environment 902. The data storage 910 can include, host, or provide one or more real or virtual datastores 926A-926N (hereinafter referred to collectively and/or generically as "datastores 926"). The datastores 926 are configured to host data used or created by the application servers 908 and/or other data. Although not illustrated in FIG. 9, the datastores 926 also can host or store web page documents, word documents, presentation documents, data structures, algorithms for execution by a recommendation engine, and/or other data utilized by any application program or another module. Aspects of the datastores 926 may be associated with a service for storing files.

The computing environment 902 can communicate with, or be accessed by, the network interfaces 912. The network interfaces 912 can include various types of network hardware and software for supporting communications between two or more computing devices including, but not limited to, the computing devices and the servers. It should be appreciated that the network interfaces 912 also may be utilized to connect to other types of networks and/or computer systems.

It should be understood that the distributed computing environment 900 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 900 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 900 to utilize the functionality described herein for providing the techniques disclosed herein, among other aspects. In one specific example, as summarized above, techniques described herein may be implemented, at least in part, by web browser application, which works in conjunction with the application servers 908 of FIG. 9.

Figure 10:
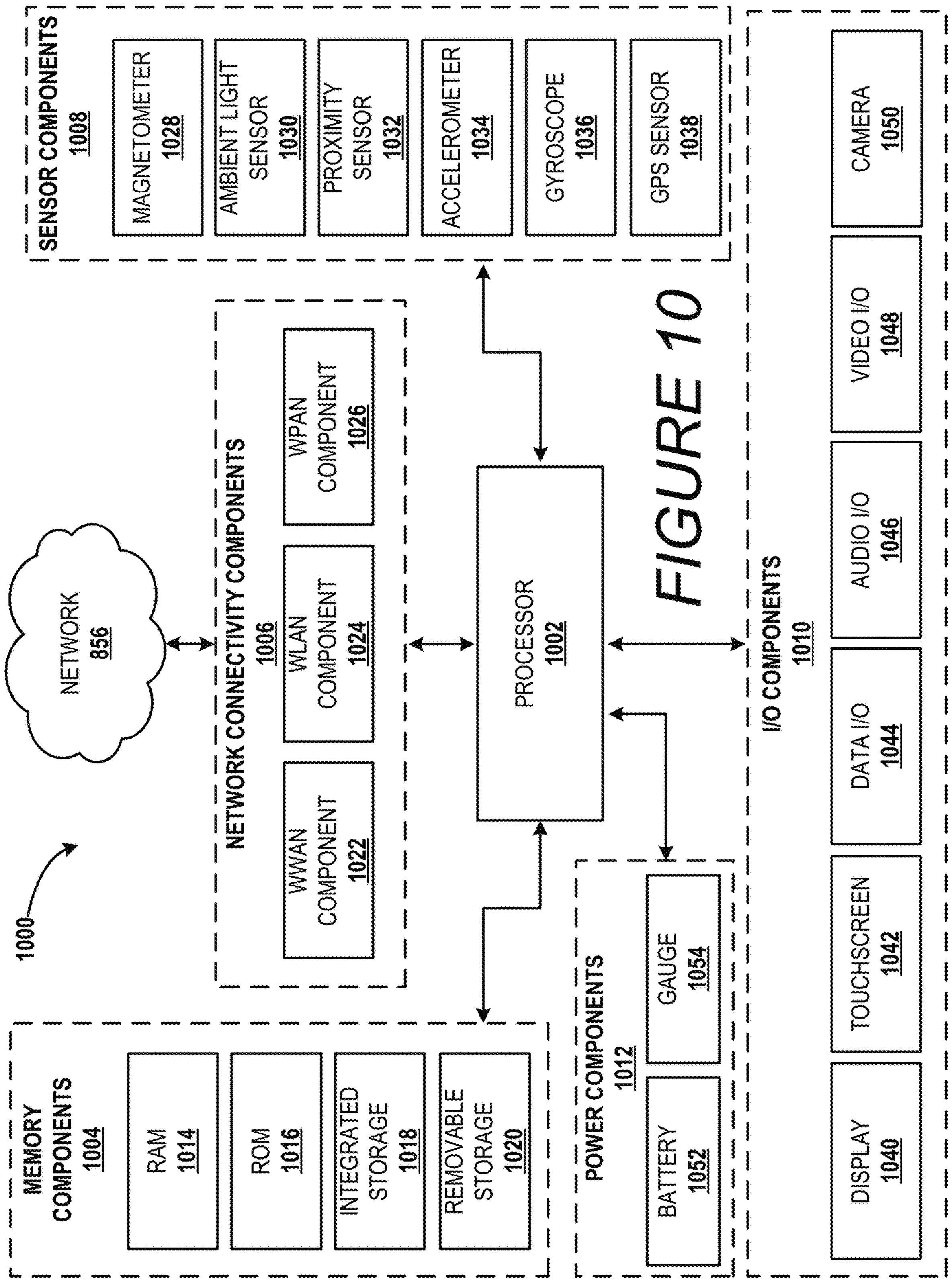
FIG. 10 is a computer architecture diagram illustrating a computing device architecture for a computing device capable of implementing aspects of the techniques and technologies presented herein.

Turning now to FIG. 10, an illustrative computing device architecture 1000 for a computing device that is capable of executing various software components described herein for enabling aspects of the present disclosure. The computing device architecture 1000 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 1000 is applicable to any of the computing devices shown in FIG. 1. Moreover, aspects of the computing device architecture 1000 may be applicable to traditional desktop computers, portable computers (e.g., phones, laptops, notebooks, ultra-portables, and netbooks), server computers, and other computer systems, such as described herein with reference to FIGURE. For example, the single touch and multi-touch aspects disclosed herein below may be applied to desktop computers that utilize a touchscreen or some other touch-enabled device, such as a touch-enabled track pad or touch-enabled mouse.

The computing device architecture 1000 illustrated in FIG. 10 includes a processor 1002, memory components 1004, network connectivity components 1006, sensor components 1008, input/output components 1010, and power components 1012. In the illustrated configuration, the processor 1002 is in communication with the memory components 1004, the network connectivity components 1006, the sensor components 1008, the input/output ("I/O") components 1010, and the power components 1012. Although no connections are shown between the individuals components illustrated in FIG. 10, the components can interact to carry out device functions. In some configurations, the components are arranged so as to communicate via one or more busses (not shown in FIG. 10).

The processor 1002 includes a CPU configured to process data, execute computer-executable instructions of one or more application programs, and communicate with other components of the computing device architecture 1000 in order to perform various functionality described herein. The processor 1002 may be utilized to execute aspects of the software components presented herein and, particularly, those that utilize, at least in part, a touch-enabled input.

In some configurations, the processor 1002 includes a graphics processing unit ("GPU") configured to accelerate operations performed by the CPU, including, but not limited to, operations performed by executing general-purpose scientific and/or engineering computing applications, as well as graphics-intensive computing applications such as high-resolution video (e.g., 720P, 1080P, and higher resolution), video games, 3D modeling applications, and the like. In some configurations, the processor 1002 is configured to communicate with a discrete GPU (also not shown in FIG. 10). In any case, the CPU and GPU may be configured in accordance with a co-processing CPU/GPU computing model, wherein the sequential part of an application executes on the CPU and the computationally-intensive part is accelerated by the GPU.

In some configurations, the processor 1002 is, or is included in, a system-on-chip ("SoC") along with one or more of the other components described herein below. For example, the SoC may include the processor 1002, a GPU, one or more of the network connectivity components 1006, and one or more of the sensor components 1008. In some configurations, the processor 1002 is fabricated, in part, utilizing a package-on-package ("PoP") integrated circuit packaging technique. The processor 1002 may be a single core or multi-core processor.

The processor 1002 may be created in accordance with an ARM architecture, available for license from ARM HOLDINGS of Cambridge, United Kingdom. Alternatively, the processor 1002 may be created in accordance with an x86 architecture, such as is available from INTEL CORPORATION of Mountain View, California and others. In some configurations, the processor 1002 is a SNAPDRAGON SoC, available from QUALCOMM of San Diego, California, a TEGRA SoC, available from NVIDIA of Santa Clara, California, a HUMMINGBIRD SoC, available from SAMSUNG of Seoul, South Korea, an Open Multimedia Application Platform ("OMAP") SoC, available from TEXAS INSTRUMENTS of Dallas, Texas, a customized version of any of the above SoCs, or a proprietary SoC.

The memory components 1004 include a RAM 1014, a ROM 1016, an integrated storage memory ("integrated storage") 1018, and a removable storage memory ("removable storage") 1020. In some configurations, the RAM 1014 or a portion thereof, the ROM 1016 or a portion thereof, and/or some combination of the RAM 1014 and the ROM 1016 is integrated in the processor 1002. In some configurations, the ROM 1016 is configured to store a firmware, an operating system or a portion thereof (e.g., operating system kernel), and/or a bootloader to load an operating system kernel from the integrated storage 1018 and/or the removable storage 1020.

The integrated storage 1018 can include a solid-state memory, a hard disk, or a combination of solid-state memory and a hard disk. The integrated storage 1018 may be soldered or otherwise connected to a logic board upon which the processor 1002 and other components described herein also may be connected. As such, the integrated storage 1018 is integrated in the computing device. The integrated storage 1018 is configured to store an operating system or portions thereof, application programs, data, and other software components described herein.

The removable storage 1020 can include a solid-state memory, a hard disk, or a combination of solid-state memory and a hard disk. In some configurations, the removable storage 1020 is provided in lieu of the integrated storage 1018. In other configurations, the removable storage 1020 is provided as additional optional storage. In some configurations, the removable storage 1020 is logically combined with the integrated storage 1018 such that the total available storage is made available as a total combined storage capacity. In some configurations, the total combined capacity of the integrated storage 1018 and the removable storage 1020 is shown to a user instead of separate storage capacities for the integrated storage 1018 and the removable storage 1020.

The removable storage 1020 is configured to be inserted into a removable storage memory slot (not shown) or other mechanism by which the removable storage 1020 is inserted and secured to facilitate a connection over which the removable storage 1020 can communicate with other components of the computing device, such as the processor 1002. The removable storage 1020 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1004 can store an operating system. According to various configurations, the operating system includes, but is not limited to, IOS from Apple Inc. of Cupertino, California, and ANDROID OS from Google Inc. of Mountain View, California. Other operating systems are contemplated.

The network connectivity components 1006 include a wireless wide area network component ("WWAN component") 1022, a wireless local area network component ("WLAN component") 1024, and a wireless personal area network component ("WPAN component") 1026. The network connectivity components 1006 facilitate communications to and from the network 856 or another network, which may be a WWAN, a WLAN, or a WPAN. Although only the network 856 is illustrated, the network connectivity components 1006 may facilitate simultaneous communication with multiple networks, including the network 904 of FIG.

9. For example, the network connectivity components 1006 may facilitate simultaneous communications with multiple networks via one or more of a WWAN, a WLAN, or a WPAN.

The network 856 may be or may include a WWAN, such as a mobile telecommunications network utilizing one or more mobile telecommunications technologies to provide voice and/or data services to a computing device utilizing the computing device architecture 1000 via the WWAN component 1022. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 856 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 856 may be configured to provide voice and/or data communications with any combination of the above technologies. The network 856 may be configured to or adapted to provide voice and/or data communications in accordance with future generation technologies.

In some configurations, the WWAN component 1022 is configured to provide dual-multi-mode connectivity to the network 856. For example, the WWAN component 1022 may be configured to provide connectivity to the network 856, wherein the network 856 provides service via GSM and UMTS technologies, or via some other combination of technologies. Alternatively, multiple WWAN components 1022 may be utilized to perform such functionality, and/or provide additional functionality to support other non-compatible technologies (i.e., incapable of being supported by a single WWAN component). The WWAN component 1022 may facilitate similar connectivity to multiple networks (e.g., a UMTS network and an LTE network).

The network 856 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1024 is configured to connect to the network 856 via the WI-FI access points. Such connections may be secured via various encryption technologies including, but not limited, WI-FI Protected Access ("WPA"), WPA2, Wired Equivalent Privacy ("WEP"), and the like.

The network 856 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1026 is configured to facilitate communications with other devices, such as peripherals, computers, or other computing devices via the WPAN.

The sensor components 1008 include a magnetometer 1028, an ambient light sensor 1030, a proximity sensor 1032, an accelerometer 1034, a gyroscope 1036, and a Global Positioning System sensor ("GPS sensor") 1038. It is contemplated that other sensors, such as, but not limited to, temperature sensors or shock detection sensors, also may be incorporated in the computing device architecture 1000.

The magnetometer 1028 is configured to measure the strength and direction of a magnetic field. In some configurations the magnetometer 1028 provides measurements to a compass application program stored within one of the memory components 1004 in order to provide a user with accurate directions in a frame of reference including the cardinal directions, north, south, east, and west. Similar measurements may be provided to a navigation application program that includes a compass component. Other uses of measurements obtained by the magnetometer 1028 are contemplated.

The ambient light sensor 1030 is configured to measure ambient light. In some configurations, the ambient light sensor 1030 provides measurements to an application program stored within one the memory components 1004 in order to automatically adjust the brightness of a display (described below) to compensate for low-light and high-light environments. Other uses of measurements obtained by the ambient light sensor 1030 are contemplated.

The proximity sensor 1032 is configured to detect the presence of an object or thing in proximity to the computing device without direct contact. In some configurations, the proximity sensor 1032 detects the presence of a user's body (e.g., the user's face) and provides this information to an application program stored within one of the memory components 1004 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 1032 are contemplated.

The accelerometer 1034 is configured to measure proper acceleration. In some configurations, output from the accelerometer 1034 is used by an application program as an input mechanism to control some functionality of the application program. For example, the application program may be a video game in which a character, a portion thereof, or an object is moved or otherwise manipulated in response to input received via the accelerometer 1034. In some configurations, output from the accelerometer 1034 is provided to an application program for use in switching between landscape and portrait modes, calculating coordinate acceleration, or detecting a fall. Other uses of the accelerometer 1034 are contemplated.

The gyroscope 1036 is configured to measure and maintain orientation. In some configurations, output from the gyroscope 1036 is used by an application program as an input mechanism to control some functionality of the application program. For example, the gyroscope 1036 can be used for accurate recognition of movement within a 3D environment of a video game application or some other application. In some configurations, an application program utilizes output from the gyroscope 1036 and the accelerometer 1034 to enhance control of some functionality of the application program. Other uses of the gyroscope 1036 are contemplated.

The GPS sensor 1038 is configured to receive signals from GPS satellites for use in calculating a location. The location calculated by the GPS sensor 1038 may be used by any application program that requires or benefits from location information. For example, the location calculated by the GPS sensor 1038 may be used with a navigation application program to provide directions from the location to a destination or directions from the destination to the location. Moreover, the GPS sensor 1038 may be used to provide location information to an external location-based service, such as E911 service. The GPS sensor 1038 may obtain location information generated via WI-FI, WIMAX, and/or cellular triangulation techniques utilizing one or more of the network connectivity components 1006 to aid the GPS sensor 1038 in obtaining a location fix. The GPS sensor 1038 may also be used in Assisted GPS ("A-GPS") systems. The GPS sensor 1038 can also operate in conjunction with other components, such as the processor 1002, to generate positioning data for the computing device 1000.

The I/O components 1010 include a display 1040, a touchscreen 1042, a data I/O interface component ("data I/O") 1044, an audio I/O interface component ("audio I/O") 1046, a video I/O interface component ("video I/O") 1048, and a camera 1050. In some configurations, the display 1040 and the touchscreen 1042 are combined. In some configurations two or more of the data I/O component 1044, the audio I/O component 1046, and the video I/O component 1048 are combined. The I/O components 1010 may include discrete processors configured to support the various interface described below or may include processing functionality built-in to the processor 1002.

The display 1040 is an output device configured to present information in a visual form. In particular, the display 1040 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1040 is a liquid crystal display ("LCD") utilizing any active or passive matrix technology and any backlighting technology (if used). In some configurations, the display 1040 is an organic light emitting diode ("OLED") display. Other display types are contemplated.

The touchscreen 1042, also referred to herein as a "touch-enabled screen," is an input device configured to detect the presence and location of a touch. The touchscreen 1042 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 1042 is incorporated on top of the display 1040 as a transparent layer to enable a user to use one or more touches to interact with objects or other information presented on the display 1040. In other configurations, the touchscreen 1042 is a touch pad incorporated on a surface of the computing device that does not include the display 1040. For example, the computing device may have a touchscreen incorporated on top of the display 1040 and a touch pad on a surface opposite the display 1040.

In some configurations, the touchscreen 1042 is a single-touch touchscreen. In other configurations, the touchscreen 1042 is a multi-touch touchscreen. In some configurations, the touchscreen 1042 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 1042. As such, a developer may create gestures that are specific to a particular application program.

In some configurations, the touchscreen 1042 supports a tap gesture in which a user taps the touchscreen 1042 once on an item presented on the display 1040. The tap gesture may be used for various reasons including, but not limited to, opening or launching whatever the user taps. In some configurations, the touchscreen 1042 supports a double tap gesture in which a user taps the touchscreen 1042 twice on an item presented on the display 1040. The double tap gesture may be used for various reasons including, but not limited to, zooming in or zooming out in stages. In some configurations, the touchscreen 1042 supports a tap and hold gesture in which a user taps the touchscreen 1042 and maintains contact for at least a pre-defined time. The tap and hold gesture may be used for various reasons including, but not limited to, opening a context-specific menu.

In some configurations, the touchscreen 1042 supports a pan gesture in which a user places a finger on the touchscreen 1042 and maintains contact with the touchscreen 1042 while moving the finger on the touchscreen 1042. The pan gesture may be used for various reasons including, but not limited to, moving through screens, images, or menus at a controlled rate. Multiple finger pan gestures are also contemplated. In some configurations, the touchscreen 1042 supports a flick gesture in which a user swipes a finger in the direction the user wants the screen to move. The flick gesture may be used for various reasons including, but not limited to, scrolling horizontally or vertically through menus or pages. In some configurations, the touchscreen 1042 supports a pinch and stretch gesture in which a user makes a pinching motion with two fingers (e.g., thumb and forefinger) on the touchscreen 1042 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 1042. As such, the above gestures should be understood as being illustrative and should not be construed as being limiting in any way.

The data I/O interface component 1044 is configured to facilitate input of data to the computing device and output of data from the computing device. In some configurations, the data I/O interface component 1044 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1046 is configured to provide audio input and/or output capabilities to the computing device. In some configurations, the audio I/O interface component 1046 includes a microphone configured to collect audio signals. In some configurations, the audio I/O interface component 1046 includes a headphone jack configured to provide connectivity for headphones or other external speakers. In some configurations, the audio I/O interface component 1046 includes a speaker for the output of audio signals. In some configurations, the audio I/O interface component 1046 includes an optical audio cable out.

The video I/O interface component 1048 is configured to provide video input and/or output capabilities to the computing device. In some configurations, the video I/O interface component 1048 includes a video connector configured to receive video as input from another device (e.g., a video media player such as a DVD or BLURAY player) or send video as output to another device (e.g., a monitor, a television, or some other external display). In some configurations, the video I/O interface component 1048 includes a High-Definition Multimedia Interface ("HDMI"), mini-HDMI, micro-HDMI, DisplayPort, or proprietary connector to input/output video content. In some configurations, the video I/O interface component 1048 or portions thereof is combined with the audio I/O interface component 1046 or portions thereof.

The camera 1050 can be configured to capture still images and/or video. The camera 1050 may utilize a charge coupled device ("CCD") or a complementary metal oxide semiconductor ("CMOS") image sensor to capture images. In some configurations, the camera 1050 includes a flash to aid in taking pictures in low-light environments. Settings for the camera 1050 may be implemented as hardware or software buttons.

Although not illustrated, one or more hardware buttons may also be included in the computing device architecture 1000. The hardware buttons may be used for controlling some operational aspect of the computing device. The hardware buttons may be dedicated buttons or multi-use buttons. The hardware buttons may be mechanical or sensor-based.

The illustrated power components 1012 include one or more batteries 1052, which can be connected to a battery gauge 1054. The batteries 1052 may be rechargeable or disposable. Rechargeable battery types include, but are not limited to, lithium polymer, lithium ion, nickel cadmium, and nickel metal hydride. Each of the batteries 1052 may be made of one or more cells.

The battery gauge 1054 can be configured to measure battery parameters such as current, voltage, and temperature. In some configurations, the battery gauge 1054 is configured to measure the effect of a battery's discharge rate, temperature, age and other factors to predict remaining life within a certain percentage of error. In some configurations, the battery gauge 1054 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1012 may also include a power connector, which may be combined with one or more of the aforementioned I/O components 1010. The power components 1012 may interface with an external power system or charging equipment via an I/O component.

The alignment and position of the second computing device can be detected by the use of a number of different types of sensors. For example, RF sensors, optical proximity sensors, and location sensors (Wi-Fi, GPS, etc.) can be utilized. In some embodiments, cameras RF sensors, optical proximity sensors, location sensors, feedback sensors, vibration sensors, or any other suitable sensor can be used to determine when a user has tapped (i.e. touched) a display surface of a computing device.

The following clauses are to supplement the present disclosure.

Clause A: A method for execution on a server (101) configured to manage an interim connection for a guest computer (102) for secure delivery of content data (111) from the guest computer (102) to a host computer (103), the method comprising: receiving input data (201) from the host computer (103), the input data (201) generated from an input device (115) of the host computer (103) used for confirming that a user is physically present at the host computer (103) by an interaction between the user and the input device (115) of the host computer (103) indicating a request to establish the interim connection between the guest computer (102) and the host computer (103); generating a connection identifier (202) in response to receiving the input data (201) confirming the interaction between the user and the host computer (103), the connection identifier (202) configured to establish the interim connection between the guest computer (102) and the host computer (103) through the server (101); causing a transmission of the connection identifier (202) from the server (101) to the host computer (103), the transmission of the connection identifier (202) causing a display of a graphical element (301) on a screen (115) of the host computer (103), the graphical element (301) configured for visually conveying the connection identifier (202), wherein the display of the graphical element (301) enables communication of connection identifier (202) to the guest computer (102); receiving a confirmation input (501) from the guest computer, the confirmation input (501) causing the server (101) to establish the interim connection (510) between the guest computer (102) and the host computer (103) through the server (101), wherein the confirmation input (501) comprises the connection identifier (202); in response to receiving the confirmation input (501) from the guest computer (102), causing an initiation of the interim connection (510) between the guest computer (102) and the host computer (103) using the connection identifier (202), wherein the interim connection (510) enables secure delivery of the content data (111) from the guest computer (102) to the host computer (103); and terminating the interim connection (510) in response to a detection of one or more events at the server (101), wherein the server (101) regulates subsequent processes for generating new connection identifiers, wherein the subsequent processes prevents or reduces occurrences where one or more new connection identifiers are identical to the connection identifier (202).

Clause B: The method of Clause A, wherein the connection identifier is embedded in an image configured to visually communicate the connection identifier from the host computer to the guest computer capturing the image with an image sensor, wherein receipt of the connection identifier at the guest computer causes the guest computer to send the confirmation input to the server.

Clause C: The method of Clause A through Clause B, wherein the one or more events causing the termination of the interim connection comprises at least one of receiving a supplemental input from the guest computer requesting termination of the interim connection, determining that the interim connection has not been used for a predetermined time period, or determining that a predetermined amount of data has been communicate over the interim connection.

Clause D: The method of Clause A through Clause C, wherein the one or more events causing the termination of the temporary connection comprises receiving a supplemental input from the host computer requesting termination of the interim connection.

Clause E: The method of Clause A through Clause D, wherein the interim connection comprises a first connection between the guest computer and the server and a second connection between the host computer and the server, wherein the secure delivery of the content data from the guest computer to the host computer comprises communicating the content data from the guest computer to the server, wherein the server relays the content data to the host computer in response to receiving the content data at the server.

Clause F: The method of Clause A through Clause E, wherein the interim connection comprises a first connection between the guest computer and the server and a second connection between the host computer and the server, wherein the secure delivery of the content data from the guest computer to the host computer comprises communicating the content data from the guest computer to the server, wherein the server relays the content data to the host computer in response to receiving the content data at the server, the server configured to restrict storage of the content data on a storage device controlled by the server.

Clause G: The method of Clause A through Clause F, wherein the delivery of the content data from the guest computer to the host computer causes the host computer to display a rendering of the content data on the screen of the host computer.

Clause H: The method of Clause A through Clause G, wherein termination of the interim connection causes the server to invalidate the connection identifier preventing the guest computer from providing additional content data.

Clause I: The method of Clause A through Clause H, wherein the rendering of the content data is automatically displayed in response to detecting that the host computer is in a predetermined state, wherein the predetermined state comprises a lock screen mode or a bulletin board mode, wherein the rendering of the content data is persistently displayed in the predetermined state until the computing device transitions out of the predetermined state.

Clause J: The method of Clause A through Clause I, wherein the rendering of the content data can be modified by a user input performed by any user of the host device, wherein a modification includes modifications with respect to a size and a position of the rendered content within the user interface.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A method for execution on a server configured to manage a temporary interim connection for a guest computer for secure delivery of content data from the guest computer to a host computer, the method comprising:

receiving input data from the host computer, the input data generated from an input device of the host computer by an interaction between a user and the input device of the host computer indicating a request to establish the interim connection between the guest computer and the host computer;

confirming that the user is physically present at the host computer based on the input data;

generating a connection identifier in response to receiving the input data confirming the interaction between the user and the host computer, the connection identifier configured to establish the interim connection between the guest computer and the host computer through the server;

causing a transmission of the connection identifier from the server to the host computer, the transmission of the connection identifier causing a display of a graphical element on a screen of the host computer, the graphical element configured for visually conveying the connection identifier, wherein the display of the graphical element enables communication of connection identifier to the guest computer;

receiving a confirmation input from the guest computer, the confirmation input causing the server to establish the interim connection between the guest computer and the host computer through the server, wherein the confirmation input comprises the connection identifier;

in response to receiving the confirmation input from the guest computer, causing an initiation of the interim connection between the guest computer and the host computer using the connection identifier, wherein the interim connection comprises a first connection between the guest computer and the server and a second connection between the host computer and the server, and the interim connection enables secure delivery of the content data from the guest computer to the host computer for display on the host computer;

receiving one or more proximity signals from a proximity sensor integrated with the host computer indicating a distance of the user from the host computer; and based at least in part on the proximity signals from the proximity sensor indicating that the user is outside of a predetermined distance from the host computer, terminating the first connection of the interim connection while maintaining the second connection of the interim connection, wherein the server regulates subsequent processes for generating new connection identifiers to prevent occurrences where one or more new connection identifiers are identical to the connection identifier, and the host computer continues to display the content data after termination of the first connection.

2. The method of claim 1, wherein the connection identifier is embedded in an image configured to visually communicate the connection identifier from the host computer to the guest computer capturing the image with an image sensor, wherein receipt of the connection identifier at the guest computer causes the guest computer to send the confirmation input to the server.

3. The method of claim 1, wherein termination of the interim connection is further based on determining that the interim connection has not been used for a predetermined time period.

4. The method of claim 1, wherein termination of the interim connection is further based on receiving a supplemental input from the host computer requesting termination of the interim connection.

5. The method of claim 1, wherein the server is configured to restrict storage of the content data on a storage device controlled by the server.

6. The method of claim 1, wherein termination of the interim connection causes the server to invalidate the connection identifier preventing the guest computer from providing additional content data.

7. The method of claim 1, wherein a rendering of the content data is automatically displayed in response to detecting that the host computer is in a predetermined state, wherein the predetermined state comprises a lock screen mode or a bulletin board mode, wherein the rendering of the content data is persistently displayed in the predetermined state until the computing device transitions out of the predetermined state.

8. The method of claim 7, wherein the rendering of the content data can be modified by a user input performed by any user of the host device, wherein a modification includes modifications with respect to a size and a position of the rendered content within the user interface.

9. A computing device for managing a temporary interim connection for a guest computer for secure delivery of content data from the guest computer to a host computer, the computing device comprising:

one or more processing units; and a computer-readable storage medium having encoded thereon computer-executable instructions to cause the one or more processing units to perform a method comprising:

receiving input data from the host computer, the input data generated from an input device of the host computer by an interaction between the user and the input device of the host computer indicating a request to establish the interim connection between the guest computer and the host computer, wherein the input data includes a hardware identifier of the input;

confirming that the user is physically present at the host computer based on the hardware identifier in the input data;

generating a connection identifier in response to receiving the input data confirming the interaction between the user and the host computer, the connection identifier configured to establish the interim connection between the guest computer and the host computer through the computing device;

causing a transmission of the connection identifier from the computing device to the host computer, the transmission of the connection identifier causing a generation of a signal for communicating the connection identifier or the transmission of the connection identifier causes the host device to display of a graphical element on a screen of the host computer the graphical element configured for visually conveying the connection identifier, wherein the display of the graphical element or the signal enables communication of connection identifier from the host device to the guest computer;

receiving a confirmation input from the guest computer, the confirmation input causing the computing device to establish the interim connection between the guest computer and the host computer through the computing device, wherein the confirmation input comprises the connection identifier;

in response to receiving the confirmation input from the guest computer, causing an initiation of the interim connection between the guest computer and the host computer using the connection identifier, wherein the interim connection enables secure delivery of the content data from the guest computer to the host computer for display on the host computer;

receiving one or more proximity signals from a proximity sensor integrated with the host computer indicating a distance of the user from the host computer; and based at least in part on the proximity signals from the proximity sensor indicating that the user is outside of a predetermined distance from the host computer, terminating the interim connection, wherein the computing device regulates subsequent processes for generating new connection identifiers to prevent occurrences where one or more new connection identifiers are identical to the connection identifier, and the host computer continues to display the content data after termination of the first connection.

10. The computing device of claim 9, wherein the connection identifier is embedded in an image configured to visually communicate the connection identifier from the host computer to the guest computer using a camera to capture connection identifier through the image with an image sensor, wherein receipt of the connection identifier at the guest computer causes the guest computer to send the confirmation input to the computing device, wherein the image further communicates an encryption key for encrypting the content data communicated between the host device and the guest computer.

11. The computing device of claim 9, wherein the termination of the interim connection is further based on at least one of receiving a supplemental input from the guest computer requesting termination of the interim connection, determining that the interim connection has not been used for a predetermined time period, or determining that a predetermined amount of data has been communicated over the interim connection.

12. The computing device of claim 9, wherein a rendering of the content data is automatically displayed in response to detecting that the host computer is in a predetermined state, wherein the predetermined state comprises a lock screen mode or a bulletin board mode, wherein the rendering of the content data is persistently displayed in the predetermined state until the computing device receives a command to remove the rendering of the content data.

13. The computing device of claim 9, wherein the interim connection comprises a first connection between the guest computer and a server and a second connection between the host computer and the server, wherein the secure delivery of the content data from the guest computer to the host computer comprises communicating the content data from the guest computer to the server, wherein the server relays the content data to the host computer in response to receiving the content data at the server.

14. A computing device for managing a temporary interim connection for a guest computer for secure delivery of content data from the guest computer to a host computer, the computing device comprising:

one or more processing units; and a computer-readable storage medium having encoded thereon computer-executable instructions to cause the one or more processing units to perform a method comprising:

receiving input data from the host computer, the input data generated from an input device of the host computer by an interaction between the user and the input device of the host computer indicating a request to establish the interim connection between the guest computer and the host computer;

confirming that the user is physically present at the host computer based on the input data;

generating a connection identifier in response to receiving the input data confirming the interaction between the user and the host computer, the connection identifier configured to establish the interim connection between the guest computer and the host computer through a server;

causing a transmission of the connection identifier from the server to the host computer, the transmission of the connection identifier causing a display of a graphical element on a screen of the host computer, the graphical element configured for visually conveying the connection identifier, wherein the display of the graphical element enables communication of connection identifier to the guest computer;

receiving a confirmation input from the guest computer, the confirmation input causing the server to establish the interim connection between the guest computer and the host computer through the server, wherein the confirmation input comprises the connection identifier;

in response to receiving the confirmation input from the guest computer, causing an initiation of the interim connection between the guest computer and the host computer using the connection identifier, wherein the interim connection enables secure delivery of the content data from the guest computer to the host computer for display on the host computer;

receiving one or more proximity signals from a proximity sensor integrated with the host computer indicating a distance of the user from the host computer; and based at least in part on the proximity signals from the proximity sensor indicating that the user is outside of a predetermined distance from the host computer, actively terminating the interim connection, wherein the server regulates subsequent processes for generating new connection identifiers, wherein the subsequent processes prevents occurrences where one or more new connection identifiers are identical to the connection identifier, and the host computer continues to display the content data after termination of the first connection.

15. The computing device of claim 14, wherein the connection identifier is embedded in an image configured to visually communicate the connection identifier from the host computer to the guest computer capturing the image with an image sensor, wherein receipt of the connection identifier at the guest computer causes the guest computer to send the confirmation input to the server.

16. The computing device of claim 14, wherein the termination of the interim connection is further based on at least one of receiving a supplemental input from the guest computer requesting termination of the interim connection, determining that the interim connection has not been used for a predetermined time period, or determining that a predetermined amount of data has been communicate over the interim connection.

17. The computing device of claim 14, wherein the termination of the temporary connection is further based on receiving a supplemental input from the host computer requesting termination of the interim connection.

18. The computing device of claim 14, wherein the interim connection comprises a first connection between the guest computer and the server and a second connection between the host computer and the server, wherein the secure delivery of the content data from the guest computer to the host computer comprises communicating the content data from the guest computer to the server, wherein the server relays the content data to the host computer in response to receiving the content data at the server.

19. The computing device of claim 14, the display of the content data by the host device, after termination of the interim connection, can be modified by a user input performed by any user of the host device.

20. The computing device of claim 19, wherein a modification to the display of the content data includes a modification with respect to a size and a position of the displayed content within the user interface.

* * * * *